Patented Sept. 4, 1945

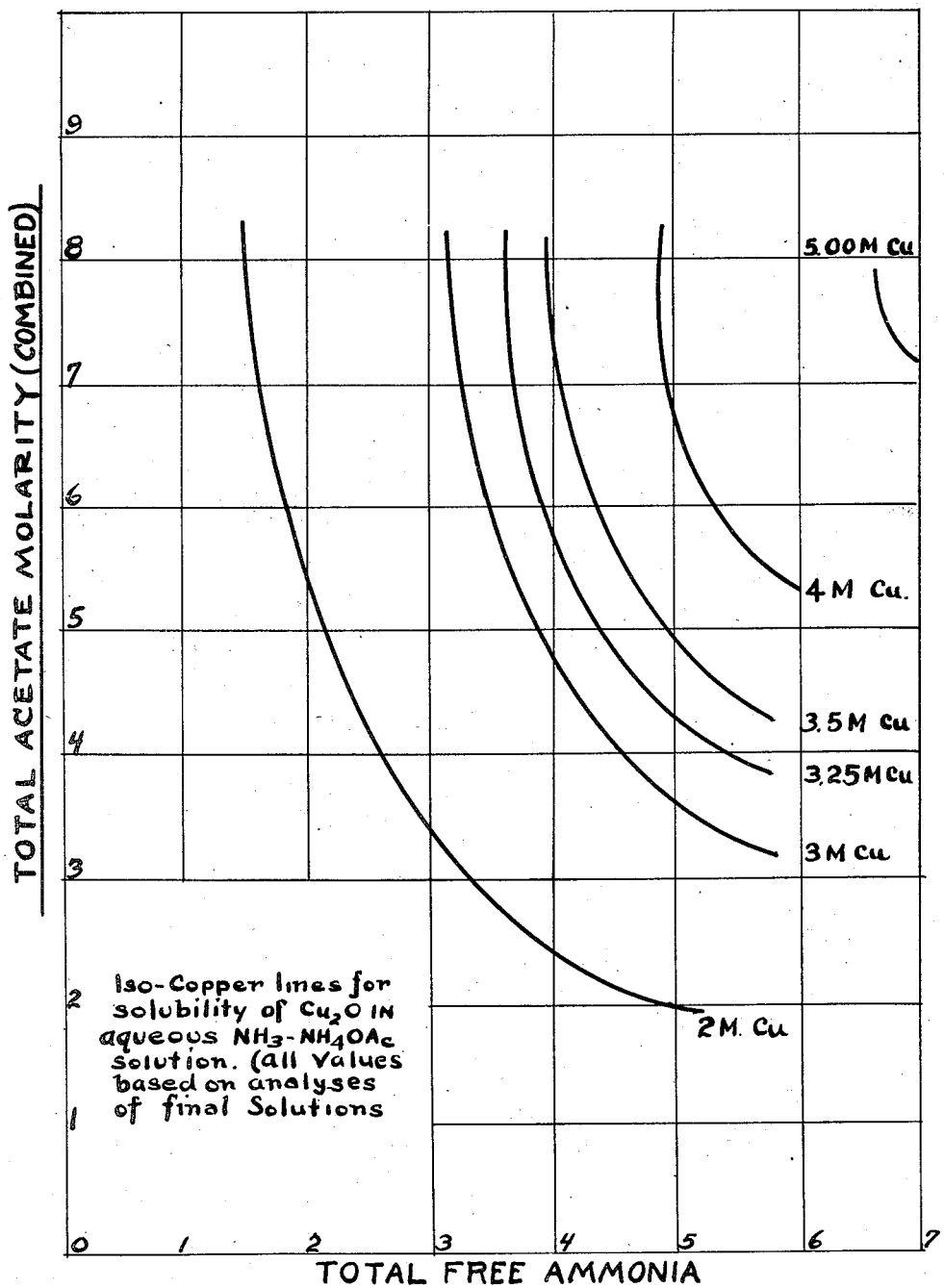

2,384,329

UNITED STATES PATENT OFFICE 2,384,329

PREVENTION OF COPPER ACETYLIDE PRECIPITATION

Charles E. Morrell, Roselle, and Miller W. Swaney, Linden, N. J., assignors to Standard Oil Development Company, a corporation of Delaware Application August 6, 1942, Serial No. 453,804

4 Claims. (Cl. 260—681.5)

This invention relates to improvements in the separation of butadiene and particularly in the prevention of the formation of copper acetylide precipitates during the extraction of butadiene with copper salt solutions.

In the commercial production of butadiene it is often necessary to preferentially extract this diolefin from mixtures of saturated and unsaturated hydrocarbons having 4 carbon atoms to the molecule and to be known hereafter as $C_4$ cuts which contain, in addition to butadiene and butenes, traces of acetylenic compounds. Certain cracked $C_4$ cuts have been found to contain as much as 1000 parts per million or more of ethyl acetylene and vinyl acetylene. It is well known that all alpha-acetylenes, $R—C\equiv CH$, form explosive acetylides with cuprous salts. Ethyl and vinyl acetylene, for example, form yellow solid copper acetylides which explode (when dry) on being subjected to a shock or heated. Consequently, in the extraction of butadiene from acetylene-containing $C_4$ cuts using cuprous salt solutions, explosive copper acetylides tend to be precipitated at the point of contact between copper solution and hydrocarbon phase. Even in some of the ammonia and cuprous-amine complex solutions there is constant danger of copper acetylide precipitation.

Butadiene and the butenes react with cuprous ions to form complexes. In acidic solutions (pH 6 or below) these cuprous-butadiene complexes are not very soluble and tend to largely precipitate. If the cuprous-amine solutions are even slightly basic (pH 7-8) however, the butadiene-copper complexes remain dissolved. Thus an ammoniacal cuprous acetate solution of low amine-cuprous ratio and of pH of about 8, or a monoethanolamine-cuprous chloride solution of pH 7 or 8 absorbs large quantities of butadiene with no precipitation of the butadiene-copper complex. Nevertheless, when an acetylene containing $C_4$ cut is contacted with such a composition, for example an ammoniacal cuprous acetate composition of 2-3 molar copper content, 7-8 molar ammonium acetate content, and 2-3 molar free ammonia content, and having a pH of about 8, yellow explosive solids are immediately formed. Consequently, in the extraction of butadiene from acetylene-containing $C_4$ cuts, using an ammoniacal cuprous acetate composition of high acetate-low ammonia content, much trouble is encountered with copper acetylide precipitation in the extraction system. The term "free ammonia" refers to that amount present in addition to that required to combine with the acetate radical.

An object of this invention is to prevent the formation of explosive cuprous acetylides in the extraction of butadiene from acetylene-containing $C_4$ cuts using cuprous salt solutions. According to this invention it has been found, however, that it is possible to prepare ammoniacal cuprous acetate solutions of constant copper molarity but possessing various ammonium acetate and free ammonia concentrations (see attached drawing of iso-copper lines).

Following is a list of 3 molar cuprous solutions, all prepared by completely saturating ammonia-acetate solutions of different composition with cuprous oxide, $Cu_2O$.

| Solution number | Cuprous molarity | Ammonium acetate molarity | Free NH₃ molarity | Total NH₃ molarity |
|---|---|---|---|---|
| I | 3.0 | 8.0 | 3.0 | 11.0 |
| II | 3.0 | 7.0 | 3.25 | 10.25 |
| III | 3.0 | 6.0 | 3.50 | 9.50 |
| IV | 3.0 | 5.0 | 4.0 | 9.0 |
| V | 3.0 | 4.0 | 4.75 | 8.75 |

In this series of constant copper solutions the ammonia acetate-ammonia ratios are seen to vary several-fold, while the free ammonia-copper ratios also vary considerably. It is further possible to add considerable additional excesses of free ammonia to these solutions, for example, to prepare the following solvent.

| Solution number | Cuprous molarity | Ammonium acetate molarity | Free NH₃ molarity | Total NH₃ molarity |
|---|---|---|---|---|
| VI | 3.0 | 4.0 | 7.0-8.0 | 11-12 |

Further it has been discovered that the solubility of copper acetylides in the "high ammonia" solutions is so vastly superior to those solutions of lower free ammonia content that no danger is encountered from copper acetylide precipitation in butadiene extraction systems employing high-ammonia solutions of ammoniacal cuprous acetate. Therefore, by taking full advantage of this remarkable increased solubility of explosive copper acetylides in high-ammonia or high-amine solutions it is possible to extract butadiene from cracked $C_4$ cuts containing otherwise prohibitive quantities of acetylenes. This is illustrated by reference to the drawing. The data indicate that at least 0.5 mole per liter of ammonia in excess of that required to solubilize the cuprous hydroxide present in dissolved form is added. The practical application of this improved feature of copper solution compositions is illustrated as follows:

A butadiene-containing cracked C₄ cut containing several thousand parts per million of acetylenes, and which would give immediate and abundant copper acetylide precipitates with low-ammonia cuprous acetate solutions, is contacted countercurrently in an absorption tower with a cold (e. g. 10° C.) copper solution (ammoniacal cuprous acetate) of about 3 molar cuprous content, 4 molar ammonium acetate content, and 7 molar free ammonia content (11 molar total ammonia content). Thereupon the butadiene and essentially all the acetylenes enter the copper phase. However, due to the high ammonia/copper ratio maintained in the copper solution, the acetylenes enter as their soluble copper acetylides and precipitation of explosive salts is completely avoided. The cold hydrocarbon-rich copper solvent is then circulated to a second countercurrent tower heated to 60° to 85° C., wherein the solution is desorbed of its dissolved butadiene and of some of its acetylenes (also other dissolved hydrocarbons such as allenes, etc.) while the remainder of the acetylenes are polymerized and/or hydrated to harmless substances which are released from the copper solvent. The essentially hydrocarbon-free (acetylene-free) copper solution is then cooled and returned to the absorption tower, and the cycle repeated many times. Thus, high acetylene-content C₄ cuts are continuously extracted, without copper acetylide precipitation, by using the improved type of copper-amine solvents advocated.

The effect of high excess ammonia on the solubility of copper acetylides in copper solutions is illustrated in the following manner:

Example 1

To a copper solution designated as Soln. No. I in the preceding table (above) and having the composition 3 M. cuprous/8 M. ammonium acetate/3 M. free ammonia was added a small quantity of solid copper ethylacetylide. The amount of this explosive copper acetylide which dissolved was practically nil. To this solution was then added enough excess ammonia to raise its free ammonia molarity to about 5 M. free ammonia content, whereupon the solid copper ethyl acetylide instantly dissolved.

Example 2

To Solution VI (above), of the composition 3 M. cuprous/4 M. ammonium acetate/7 M. free ammonia contents (11 molar total ammonia), was added pure ethyl acetylene gas at room temperature (20° C.) until the solution was saturated with copper ethyl acetylide. Thus it was found that one volume of copper solution dissolved ten volumes of pure gaseous ethyl acetylene with no trace of undissolved copper ethyl acetylide being present. This corresponds to about a 2 weight per cent concentration of dissolved copper ethyl acetylide.

Example 3

To an ammoniacal cuprous acetate solution containing 3 M. cuprous/5.5 M. ammonium acetate/5.5 M. free ammonia, was added pure ethyl acetylene gas at 20° C. until the solution was saturated with copper ethyl acetylide. Thus it was found that this solution dissolved only about one half as much (app. 5 vols. ethyl acetylene gas) as did the solution of Example 2 which had only a slightly higher amine-copper ratio.

It is not intended to limit this process to C₄ cuts alone as it is also applicable to the separation of hydrocarbons having 5 and 6 carbon atoms to the molecule.

We claim:

1. In a process of separating and segregating diolefins from diolefin and alkyl-alpha acetylene-containing mixture of hydrocarbons which comprises contacting the diolefin- and the acetylene-containing mixture of hydrocarbons having from 4 to 6 carbon atoms to the molecule with a cuprous salt solution containing at least 2 mols per liter of combined copper and at least 0.5 mol per liter of ammonia in excess of that required to solubilize the cuprous hydroxide present in dissolved form and separating the cuprous salt solution with the diolefin and acetylene in solution from the undissolved mixture of hydrocarbons.

2. The process of separating and segregating diolefins from diolefin- and alkyl-alpha acetylene-containing mixtures of hydrocarbons which comprises contacting the diolefin- and acetylene-containing mixture of hydrocarbons having 4 carbon atoms to the molecule with a cuprous salt composition containing at least 2 mols per liter of combined copper and at least 0.5 mol per liter of ammonia in excess of that required to solubilize the cuprous hydroxide present in dissolved form and separating the cuprous salt solution from the undissolved mixture of hydrocarbons.

3. The process of separating and segregating butadiene from a butadiene- and alkyl-alpha-acetylene-containing mixture of hydrocarbons which comprises contacting the butadiene and acetylene containing mixture of hydrocarbons having 4 carbon atoms to the molecule with a cuprous salt solution composed of 3 mols per liter of cuprous ion, 4 mols per liter of ammonium acetate, and 0.5 to 10 mols per liter of ammonia in excess of that required to solubilize the cuprous hydroxide present in dissolved form and separating the cuprous salt solution from the undissolved mixture of hydrocarbons.

4. The process of separating and segregating butadiene from a butadiene- and alkyl-alpha-acetylene-containing mixture of hydrocarbons which comprises contacting at 10° to 20° C. the butadiene and hydrocarbon mixture having 4 carbon atoms obtained by cracking a petroleum hydrocarbon with a cuprous salt solution composed of at least 3 mols per liter of cuprous ion, 4 mols per liter of ammonium acetate, and 0.5 to 10 mols per liter of ammonia in excess of the amount required to solubilize cuprous hydroxide and separating the cuprous salt solution from the undissolved mixture of hydrocarbons.

CHARLES E. MORRELL.
MILLER W. SWANEY.